United States Patent [19]

Levien et al.

[11] Patent Number: 5,364,475

[45] Date of Patent: Nov. 15, 1994

[54] PROCESS FOR REMOVING CHEMICAL PRESERVATIVES FROM WOOD USING SUPERCRITICAL FLUID EXTRACTION

[75] Inventors: Keith L. Levien; Jeffrey J. Morrell; Satish Kumar; Endalkachew Sahle-Demessie, all of Corvallis, Oreg.

[73] Assignee: State of Oregon acting by and through the State Board of Higher Education on behalf of Oregon State University, Eugene, Oreg.

[21] Appl. No.: 100,647

[22] Filed: Jul. 30, 1993

[51] Int. Cl.⁵ .......................... B08B 7/00; B08B 3/14; D21B 1/02
[52] U.S. Cl. ........................................ 134/42; 134/19; 162/63
[58] Field of Search ............... 134/42, 38, 19; 162/63, 162/64

[56] References Cited

U.S. PATENT DOCUMENTS

| | | | |
|---|---|---|---|
| 3,969,196 | 7/1976 | Zosel | 203/49 |
| 4,308,200 | 12/1981 | Fremont | 162/63 |
| 4,714,526 | 12/1987 | Pennisi et al. | 203/49 |
| 4,964,995 | 10/1990 | Chum et al. | 210/634 |
| 4,992,308 | 2/1991 | Sunol | 427/297 |
| 5,009,745 | 4/1991 | Hossain et al. | 162/5 |
| 5,009,746 | 4/1991 | Hossain et al. | 162/5 |
| 5,041,192 | 8/1991 | Sunol et al. | 162/63 |
| 5,074,958 | 12/1991 | Blaney et al. | 162/5 |

OTHER PUBLICATIONS

Eckert et al., "Supercritical Fluid Processing", Environmental Science and Technology, vol. 20, No. 4, Apr. 1986, pp. 319–325.

*Primary Examiner*—Paul Lieberman
*Assistant Examiner*—Lorna M. Douyon
*Attorney, Agent, or Firm*—Heller, Ehrman, White & McAuliffe

[57] ABSTRACT

The process of the present invention is directed to the remediation of wood that has been treated with a preservative, such as pentachlorophenol or other non-ionic organic biocides, using supercritical fluids, with or without the addition of modifiers.

15 Claims, 2 Drawing Sheets

PROCESS FOR REMOVING CHEMICAL PRESERVATIVES FROM WOOD USING SUPERCRITICAL FLUID EXTRACTION

The present invention relates generally to a process for supercritical fluid remediation of wood, and more particularly to the use of supercritical carbon dioxide, with or without a modifier, to remove pentachlorophenol from the wood.

BACKGROUND OF THE INVENTION

While preservative treatment significantly prolongs the service life of wood for utility poles, piling, railroad ties and other wood products, treated woods are increasingly becoming the subject of concern at the end of their life cycles. Such treated wood must be eventually removed from service due to fungal decay, insect attack, car damage, or changes in utility service needs. For many years, old treated wood was given away to local property owners for recycling into fence posts and other similar applications, but many utilities have begun to reexamine this practice due to environmental concerns.

The Environmental Protection Agency (EPA) currently regulates disposal of treated wood materials using a Toxicity Characteristic Leaching Profile (TCLP) whereby the treated wood is subjected to evaluation by a leaching test procedure. These treated wood materials are tested because they typically contain biocides, such as pentachlorophenol (PCP), that are regulated under the Resource Conservation and Recovery Act (RCRA) and are perceived as posing a health risk when placed in a land fill. In the leaching test procedure, a portion of the wood is ground and subjected to a chemical extraction. The extract is analyzed for residual chemical content. Detection of certain chemicals above prescribed limits classifies a tested material as a hazardous waste and requires that the material be placed in a hazardous waste landfill site.

The current EPA regulations specify a TCLP limit of 100 ppm for pentachlorophenol. However, proposed changes to the TCLP limit, in order to comply with new drinking water standards, would lower the acceptable level to 0.1 ppm. Most pentachlorophenol treated wood have a TCLP in the range of 7 to 10 ppm, thus these treated wood materials would fail to meet the new TCLP requirements and therefore would have to be classified and treated as hazardous wastes.

For example, there are over 187 million utility poles in the United States and approximately 40% of these poles are treated with pentachlorophenol. A typical utility company replaces approximately 1 to 2% of its wood pole system each year, creating the potential for disposal of nearly 1.5 million pentachlorophenol treated poles every year. In addition, pentachlorophenol has been used to treat wood used for decking, timber, glulaminated timbers and a variety of other products. Without effective methods for safe disposal for these treated wood products, these treated wood products will need to be shipped to a hazardous waste facility. The affect would be to increase the cost of disposal for treated wood products dramatically and, consequently, increase their cost to users and purchasers. Moreover, increasing the volume of materials going to hazardous waste facilities will accelerate the rate at which such sites reach their maximum capacity levels. As a result, there is a need for effective methods for disposing of wood treated with this chemical.

A number of different strategies have been identified for disposing of treated woods, including incineration, chemical modification or bioremediation. Each of these methods has its drawbacks. The use of incineration for disposing of treated wood materials is highly effective for eliminating pentachlorophenol. It has the added benefit of cogeneration of electrical power and steam. However, the regulatory hurdles in obtaining a license to burn pentachlorophenol treated wood are considerable, and presently there are few sites where incineration is possible.

Chemical modification or treatment employs either a detoxifying or extraction system to remove a target chemical from a waste material, thereby reducing the volume of waste which must be disposed of in a secure facility. Extraction and detoxification systems have been developed for remediating contaminated soils, but there are currently no systems available for handling treated wood.

Bioremediation has been touted as the preferred method for treating contaminants, but there are very few examples where bioremediation has been successfully employed. For the bioremediation of wood, the process involves subdividing or chipping the wood and then placing it into an environment conducive to degradation by fungi or bacteria. The process would ultimately result in decomposition of the pentachlorophenol over a period of several days to weeks, or possibly months. The process employs various types of soil farming and this can be extremely labor intensive. Studies on solid-phase and slurry-phase bioremediation of materials contaminated with pentachlorophenol have revealed that these bio-processes are slow and inefficient, achieving a maximum degradation of about 50%. It was also found that biodegradation was limited to lower molecular weight constituents rather than the more hazardous, higher molecular weight compounds. Consequently, the technology remains largely experimental.

Supercritical fluids (SCFs) have been used in a number of industrial and pollution control processes. SCFs have properties that fall between those of normal gases and liquids. Most pure substances will typically exist in a solid, liquid or gas phase. These phases can exist singly or in equilibrium with other phases. The point when the distinction between gas and liquid disappears is known as the gas-liquid critical point. The temperature and pressure at the critical point are known as the critical temperature ($T_c$) and the critical pressure ($P_c$). No gas can be liquified above its $T_c$ regardless of how great a pressure is applied. When a substance is heated above its $T_c$ and compressed beyond its $P_c$, the substance is said to be in the supercritical fluid state.

In the supercritical state, substances can be used to penetrate solid matrixes in a manner similar to a gas, due to part gas-like and part liquid-like properties. Densities of such fluids approach those of liquids. However, the density of a SCF may be continuously changed without causing a phase separation by changing pressure and/or temperature. SCF viscosities and diffusivities are also intermediate to those of the liquid and gas phases. Density dependent properties, such as solvent power, will also undergo corresponding changes and this can be advantageously used. The properties of SCFs enable them to have the solvent power of liquids but with better mass transfer properties than liquids. Supercritical extraction processes can be designed to yield a wide range of products. The extraction may be used to remove undesirable contaminants from a desired solid matrix product or to separate and isolate a valuable product from a solid matrix waste.

Supercritical fluid technology has been applied in the extraction of hazardous substances from soil and plants, including the removal of bound (nonextractable) pesticides. Recent studies on removal of DDT and polychlorinated biphenyls (PCB) and dioxins have shown that SCFs can remove pesticides from solid matrixes. Carbon dioxide is especially attractive for this use because it is safe, nontoxic, inexpensive and readily available. In the extraction of pentachlorophenol from soil, supercritical carbon dioxide has been found to recover 240% more pentachlorophenol than other solvent extraction methods, e.g., Soxhlet extractor.

SCFs are particularly useful in reducing the volume of toxins to be handled and disposed. The remaining smaller amounts of toxic materials may then be destroyed at a much lower cost through further treatment; for example, by combustion, wet oxidation, SCF oxidation or biodegradation.

Accordingly, it is an object of the present invention to provide a process for remediating pentachlorophenol treated wood using supercritical fluids.

Another object of the present invention is to provide a process for remediating pentachlorophenol treated wood that allows recovery and recycling of the extracted chemicals.

Additional objects and advantages of the invention will be set forth in the description which follows, and in part will be obvious from the description, or may be learned by practice of the invention.

SUMMARY OF THE INVENTION

The process of the present invention is directed to the remediation of wood treated with pentachlorophenol or other non-ionic organic biocides using supercritical fluids, with or without modifiers.

In carrying out the process of the present invention, a treated wood is first subdivided or chipped to a predetermined particle size. Alternatively, the outer shell of the treated wood may be stripped and chipped for processing according to the present invention, while the core is separately processed since it will usually contain little or no pentachlorophenol.

The treated wood chips are then subjected to supercritical fluid treatment, at high pressure and moderate temperatures, using, for example, carbon dioxide and modifiers. The process can be closely regulated by varying temperature or pressure. The pentachlorophenol in the resulting extract can be recovered for either reuse or disposal.

The processed wood chips will contain significantly reduced amounts of pentachlorophenol and TCLP levels of less than 0.1 ppm. The wood chips can be sent to a conventional sanitary landfill for disposal. Other applications for these processed wood chips include incorporation into composite boards, use in cogeneration of electricity, or pulping for production of paper products.

BRIEF DESCRIPTION OF THE DRAWINGS

The accompanying drawings, which are incorporated in and constitute a part of the specification, schematically illustrate the invention and, together with the general description given above and the detailed description of the invention given below, serve to explain the principles of the invention.

DETAILED DESCRIPTION OF THE INVENTION

The present invention relates to an effective and economical process for removal of pentachlorophenol from treated wood using a supercritical fluid.

The term "supercritical fluids" is used to describe those fluids which have been compressed beyond their critical pressure and also heated above their critical temperature. Supercritical fluids that may be used in the practice of this invention include those compounds with critical temperatures in the range of 5° to 150° C. Examples of fluids that may be used are nitrogen, nitrous oxide, carbon dioxide, light hydrocarbons, and various organic and inorganic gases. This listing is only representative and is not meant to be exhaustive, as there are other gases which can also be compressed and heated beyond their critical points to give supercritical fluids which exhibit the desired extraction properties. The preferred fluid to be used in the present process is carbon dioxide. It is technically more advantageous to use carbon dioxide because it is capable of deep penetration into semipermeable wood chips. Carbon dioxide is also safe, nontoxic, inexpensive and readily available for commercial use.

The term "modifier" is used to describe a cosolvent to be used together with a supercritical fluid. The modifiers that may be used include alcohols, ketones and other low boiling-point organic solvents. The preferred modifier is methanol. Modifiers will present in amounts in the range of 1 to 10 percent by weight. A mixture of modifiers can also be used.

While the present invention will be described in terms of a process for supercritical extraction of pentachlorophenol from Douglas-fir wood, it is to be understood that the present invention can be used to treat the various types of commonly used woods, including conifers, such as southern pine and western red cedar, and hardwoods, such as oak, beech, gum, tupelo or maple.

The treated wood is preferably subdivided to improve extraction efficiency. Processing the outer shell of the treated wood only will also improve extraction efficiency. The outer shell of the treated wood will contain most, if not all, of the pentachlorophenol. The depth of the outer shell will, of course, vary depending on the type of wood and the method of treatment. An advantage of the invention, however, is that the subdivision of the wood can be varied to permit sizing according to amount of pentachlorophenol to be removed, the method of disposal or type of reuse. Typically, the wood will be formed into chips which are preferably of an average size of 1 to 5 mm thick by 10 to 50 mm long. The wood can be subdivided using a conventional wood chipper.

The following example is presented for purpose of further illustrating and explaining the present invention and is not to be taken as limiting in any regard.

EXAMPLE

Figure 1:
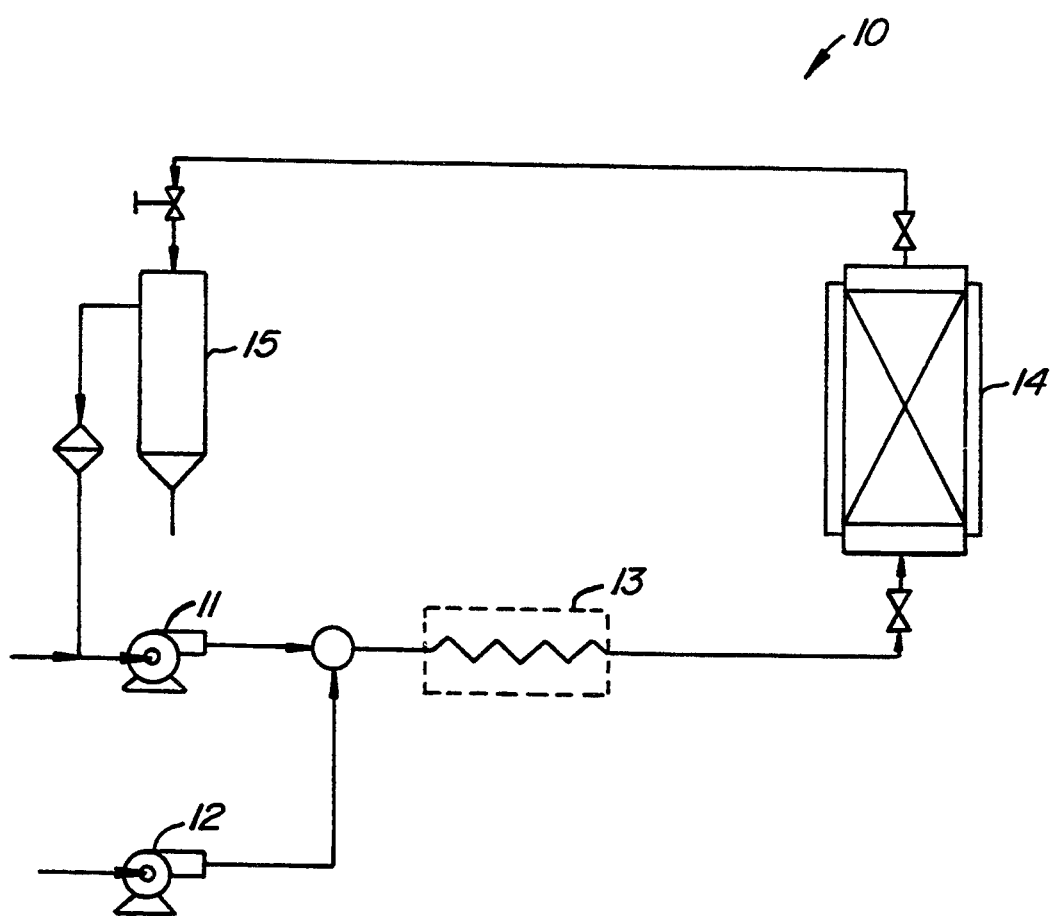
FIG. 1 is a schematic illustration of batch-processing equipment that can be used in performing the process of the present invention.

In FIG. 1, a process flow diagram is shown for a batch extraction system 10 for recovering pentachlorophenol from wood chips. All the tests were performed using supercritical carbon dioxide and a modifier. By way of example, an Isco SFE 2000 system was used, which includes two syringe pumps, Model 260 and a 100D, a pump controller and an SFX 2-10 extractor. Wood particles were loaded in a 10 ml extraction cartridge and were pressurized and heated up to the set values. A micrometering valve (ALLTECH model 86086) was used to adjust the flow rate to a desired value. A UV-Vis spectrophotometer (Isco Model V[4]) was used for on-line detection. Different modifiers were tested. The extracted pentachlorophenol and other substances were collected by bubbling the SCF through a suitable liquid solvent.

Referring to FIG. 1, as described above, the batch extraction system 10 was used to investigate the thermodynamic and mass transfer conditions for the extraction of PCP from treated wood. A high pressure pump 11 is used to pressurize the carbon dioxide above the $P_c$. A second pump 12 is used to introduce a modifier, e.g. methanol, into the system 10 at high pressure. The carbon dioxide and modifier are mixed and introduced into heater 13 to be heated above the $T_c$ for carbon dioxide. After heating, the supercritical carbon dioxide and modifier are introduced into an extractor 14. The extractor 14 contains, as characterized in Table 1 below, chipped wood containing pentachlorophenol. The wood chips are brought into contact with the supercritical carbon dioxide and modifier for about 30 minutes, after which the chips and carbon dioxide are withdrawn from the extractor 14. The supercritical fluid is directed to the separator 15 that separates the preservative solution containing the pentachlorophenol from the carbon dioxide to permit the carbon dioxide to be recycled. The amount of pentachlorophenol in the wood chips before and after the extraction were determined using an X-ray fluorescence analyzer (Asoma Instruments, Model 8620). The processed wood chips after supercritical fluid extraction contained substantially reduced amounts of pentachlorophenol as shown in Tables 2 through 7 below.

TABLE 1

| Charaterization of Pressure Treated Wood Samples | |
|---|---|
| Species | Douglas-fir |
| Size of wood chip | (1-4) mm thick, 10 × 50 mm |
| Method of treatment | Oil borne |
| Average retention prior SCF treatment | 0.7-1.3 lbs/ft$^3$. |

In the extractor 14, it is desirable to maintain conditions that result in high solubility of the pentachlorophenol and low solvent consumption. On the other hand, when the extracted biocide is to be separated from the carbon dioxide in the separator 15, the thermodynamic conditions must be set so that there is low solubility of the pentachlorophenol in the fluid. The solubility can be adjusted by varying the temperature and/or pressure.

The factors that control the rate at which pentachlorophenol is removed from a wood matrix using $CO_2$ with modifiers were studied. These factors included temperature, pressure, SCF composition, solvent flow rate, extraction time, particle size and wood properties (e.g., moisture content, permeability). All these factors are of considerable importance in the design of industrial scale extraction process systems.

Figure 2:
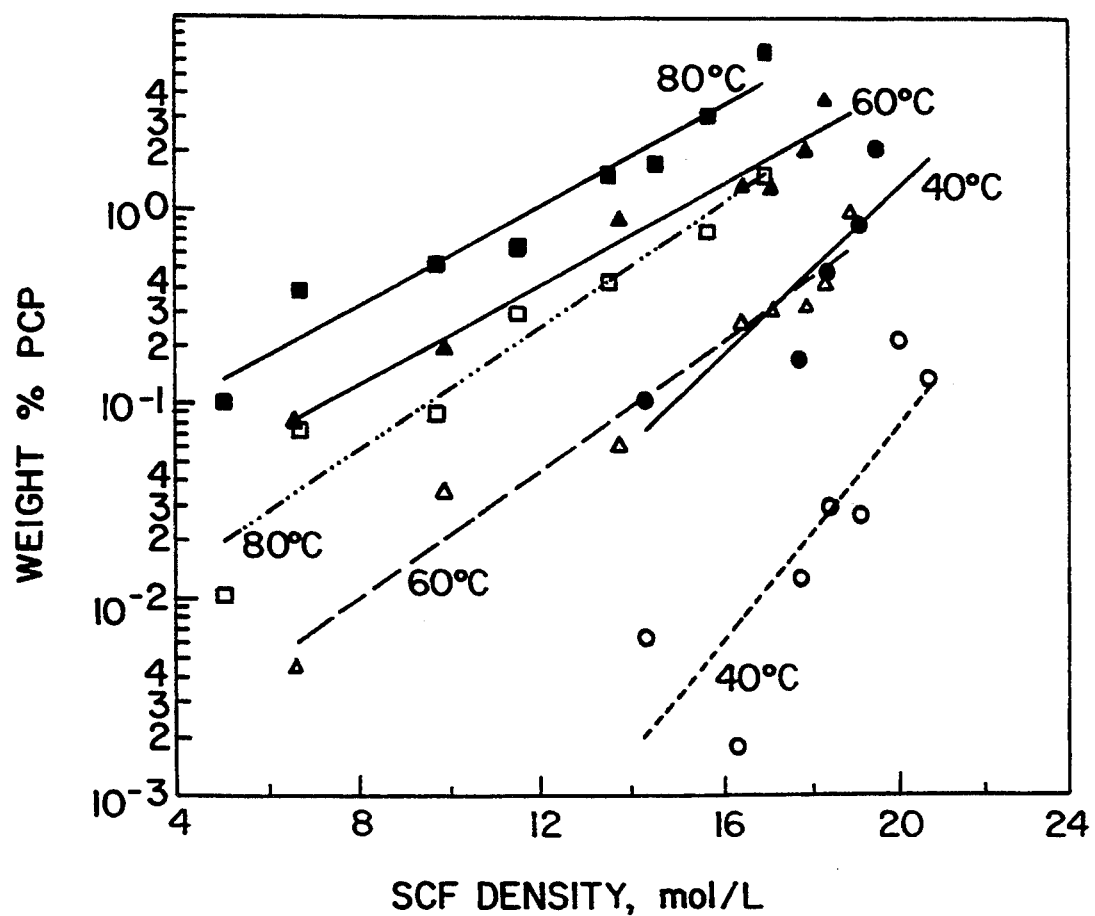
FIG. 2 is a graphical illustration showing the solubility properties of pentachlorophenol in carbon dioxide and carbon dioxide with a modifier.

In addition, fundamental phase equilibria and mass transfer data had to be obtained and understood. Referring to FIG. 2, the solubility properties of pentachlorophenol in $CO_2$ (dashed lines) and in $CO_2$ with 2.2 wt % methanol (solid lines) were investigated, since such data are not available for supercritical remediation of solids involving complex mixtures of biocide and carriers, such as petroleum based materials.

The effects of different types of modifiers and their extraction efficiency were also investigated. As shown in Table 2, methanol was found to be the best of the three modifiers. An increase in the amount of methanol from about 1.6 to 8.3 Wt % improved the extraction efficiency by more than 25% as shown in Table 3. Examples of other modifiers include acetone, ethanol, dimethylsulfoxide and dimethylformamide. It is expected that modifier effects will vary depending upon the different chemicals used to treat the wood, as well as the variety of wood being processed.

TABLE 2

Effects of Modifier Addition at
P = 4000 psi, T = 60° C., $V_{co2}/M_{pcp}$ = 15 ml/mg, F = 5 ml/min

| Modifier (8.3 Wt %) | Original PCP (Wt %) | Final PCP (Wt %) | % Removed |
|---|---|---|---|
| Acetone | 1.459 | 1.138 | 22 |
| Ethanol | 1.459 | 1.2 | 17.7 |
| Methanol | 1.459 | 0.939 | 35.6 |

TABLE 3

Effects of Amount of Methanol Modifier at
P = 4000 psi, T = 60° C., $V_{co2}/M_{pcp}$ = 15 ml/mg, F = 5 ml/min

| % Modifier | Original PCP (Wt %) | Final PCP (Wt %) | % Remove |
|---|---|---|---|
| 1.6 | 1.561 | 1.155 | 26 |
| 4.2 | 1.561 | 1.046 | 33 |
| 8.3 | 1.561 | 0.754 | 51.7 |

Pressure and temperature can greatly influence the behavior of supercritical fluids. In practicing the process of this invention, the temperature selected is at least the critical temperature for the supercritical fluid selected, and preferably, above the critical temperature. The specific temperatures and pressures, and ranges therefore, depend upon the critical temperature and the critical pressure of the supercritical fluid to be used. In addition, the temperature and pressure values for the various separation stages will be selected based on empirical determinations of the most suitable conditions for recovering the pentachlorophenol. The preferred temperature will be in the range of about 40° to 80° C. for carbon dioxide. The preferred pressure will be in the range of about 1100 to 5000 psig for carbon dioxide. Increasing either the pressure or temperature was found to increase the pentachlorophenol extraction efficiency, as shown in Tables 4 and 5.

TABLE 4

Effects of Temperature at P = 4000 psi,
8.3% Methanol, $V_{co2}/M_{pcp}$ = 15 ml/mg, F = 5 ml/min

| Temperature °C. | Original PCP (Wt %) | Final PCP (Wt %) | % Removed |
|---|---|---|---|
| 60 | 1.943 | 1.13 | 41.7 |
| 80 | 1.943 | 0.938 | 51.7 |
| 100 | 1.943 | 0.866 | 55.4 |

TABLE 5

Effects of Pressure at T = 80° C.,
8.3% Methanol, $V_{co2}/M_{pcp}$ = 15 ml/mg, F = 5 ml/min

| Pressure psi | Original PCP (Wt %) | Final PCP (Wt %) | % Removed |
|---|---|---|---|
| 2000 | 1.407 | 0.867 | 38.4 |
| 3000 | 1.407 | 0.852 | 39.5 |
| 4000 | 1.407 | 0.679 | 51.7 |

Diffusion plays an important role in SCF extraction of pentachlorophenol, and other biocides, from semiporous solids like wood. The mass-transfer behavior of biocides in wood were studied to determine optimum flow rates for SCFs as a function of extraction time and particle size. It was discovered that mass transfer occurs in two steps. First, the biocides are removed from the wood surfaces; this is a relatively fast step. Second, there is a slower desorption and diffusion of the biocides from the inner solid matrix.

Referring to Table 6, for a given solvent volume, increasing the solvent flow will reduce the extraction period. However, the extraction efficiency also decreased with shorter extraction periods. This indicates that the extraction efficiency is controlled by diffusion of pentachlorophenol or other biocide from the interior of the wood to the surface.

Referring to Table 7, as smaller wood chips were used, the distance for the pentachlorophenol to diffuse out of the wood decreased. It is a known extraction characteristic for diffusion time to increase in proportion to the square of the diffusion distance. As a result, the percentage extracted increased for smaller chips.

TABLE 6

Effects of Flow Rate at
P = 4000 psi, T = 80° C., 8.3% Methanol, $V_{co2}/M_{pcp}$ = 15 ml/mg

| Flow Rate (ml/min) | Original PCP (Wt %) | Final PCP (Wt %) | % Removed |
|---|---|---|---|
| 2 | 2.03 | 0.913 | 55 |
| 5 | 1.562 | 0.754 | 51.7 |
| 8 | 2.03 | 0.961 | 52.7 |
| 15 | 2.03 | 1.116 | 45 |

TABLE 7

Effects of Particle Size at P = 4000 psi, T = 80° C.,
8.3% Methanol, $V_{co2}/M_{pcp}$ = 15 ml/mg F = 5 ml/min.

| Chip Thickness (mm) | Original PCP (Wt %) | Final PCP (Wt %) | % Removed |
|---|---|---|---|
| 0.25* | 3.802 | 0.21 | 94 |
| 1 | 0.721 | 0.560 | 65 |
| 2 | 0.945 | 0.384 | 59.4 |
| 3 | 0.764 | 0.352 | 54 |
| 4 | 0.533 | 0.341 | 36 |

*Samples ground to pass through a 20 mesh screen.

Upon extraction with supercritical $CO_2$, the SCF will contain not only $CO_2$, modifier, pentachlorophenol and its oils, but also water and some extractable compounds from the wood. The separation process will also allow the $CO_2$ to be recovered and recycled. In addition, this complex mixture can be further processed to recover and recycle the pentachlorophenol.

While the foregoing description and illustration of the present invention has been particularly shown in detail with reference to particular examples and tests, it should be understood by those skilled in the art that the foregoing and other modifications are exemplary only, and that equivalent changes in the composition and details may be employed therein without departing from the spirit and scope of the invention as claimed except as precluded by the prior art.

What is claimed is:

1. A process for remediating pentachlorophenol containing wood comprising the steps of:
   (a) subdividing said wood; and
   (b) contacting said wood with a fluid, under a pressure and at a temperature such that said fluid is in a supercritical state, for a period of time sufficient to remove a portion of said pentachlorophenol from said wood to obtain a Toxicity Characteristic Leaching Profile level of less than 0.1 ppm for said pentachlorophenol remaining in said wood.

2. The process according to claim 1 wherein said supercritical fluid comprises supercritical carbon dioxide.

3. The process according to claim 2 wherein the pressure is above about 4000 psi and the temperature is between about 60° and about 80° C.

4. The process according to claim 2 wherein said supercritical fluid further comprises a low boiling-point organic solvent that is added as a modifier to the supercritical carbon dioxide.

5. The process according to claim 4 wherein said solvent is selected from the group consisting of methanol, ethanol and acetone.

6. The process according to claim 1 wherein said subdivided wood from step (a) has an average particle size ranging from 1 to 5 mm in thickness.

7. The process according to claim 1 wherein said supercritical fluid is contacted with said wood by passing through at a rate of about 5 milliliters per minute per gram of dry wood.

8. The process according to claim 1 wherein said pentachlorophenol containing wood is a utility pole.

9. The process according to claim 1 wherein said pentachlorophenol containing wood has a outer shell and a core, said outer shell containing substantially all of said pentachlorophenol, said outer shell being separated from said core and subdivided in step (a) for contacting with said supercritical fluid.

10. The process according to claim 1 further comprising the step of (c) recovering said pentachlorophenol from said supercritical fluid and recycling said supercritical fluid.

11. The process according to claim 1 wherein said wood is disposed of at a conventional sanitary landfill.

12. The process according to claim 1 wherein said wood is used to make paper products.

13. The process according to claim 1 wherein said wood from step (a) is sized according to the amount of pentachloropenol to be removed.

14. The process according to claim 1 wherein said wood from step (a) is sized according to the method of disposal or type of reuse.

15. The process according to claim 2 wherein the pressure is in the range of about 1100 to 5000 psi and the temperature is in the range of about 40° to 80° C.

* * * * *